United States Patent
Shingu

(10) Patent No.: US 10,538,145 B2
(45) Date of Patent: Jan. 21, 2020

(54) VEHICLE AIR CONDITIONING APPARATUS, VEHICLE INCLUDING THE SAME, AND METHOD FOR CONTROLLING VEHICLE AIR CONDITIONING APPARATUS

(71) Applicant: Mitsubishi Electric Corporation, Chiyoda-ku, Tokyo (JP)

(72) Inventor: Wahei Shingu, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 303 days.

(21) Appl. No.: 15/308,639

(22) PCT Filed: Apr. 20, 2015

(86) PCT No.: PCT/JP2015/062001
§ 371 (c)(1),
(2) Date: Nov. 3, 2016

(87) PCT Pub. No.: WO2015/174218
PCT Pub. Date: Nov. 19, 2015

(65) Prior Publication Data
US 2017/0190237 A1    Jul. 6, 2017

(30) Foreign Application Priority Data
May 13, 2014    (JP) ................. 2014-099765

(51) Int. Cl.
*B60H 1/22* (2006.01)
*B60H 1/00* (2006.01)
(Continued)

(52) U.S. Cl.
CPC ............... *B60H 1/22* (2013.01); *B60H 1/00* (2013.01); *B60H 1/321* (2013.01); *F24F 11/89* (2018.01); *F25B 29/00* (2013.01)

(58) Field of Classification Search
CPC ...... F24F 2001/0037; F24F 1/02; F24F 11/41; F24F 1/0014; F24F 1/027; F24F 11/42;
(Continued)

(56) References Cited

U.S. PATENT DOCUMENTS

RE22,584 E * 12/1944 Terry et al. .............. F24F 1/027
55/385.1
2,364,287 A * 12/1944 Gould ..................... F24F 1/027
165/62
(Continued)

FOREIGN PATENT DOCUMENTS

JP    S48-000661 U1    1/1973
JP    S48-000662 U1    1/1973
(Continued)

OTHER PUBLICATIONS

Office Action (1st Notice of Reason for Refusal) dated Mar. 30, 2018, by the Chinese Patent Office in corresponding Chinese Patent Application No. 201580023131.4 and English translation of the Office Action. (7 pages).
(Continued)

*Primary Examiner* — Christopher R Zerphey
*Assistant Examiner* — For K Ling
(74) *Attorney, Agent, or Firm* — Buchanan Ingersoll & Rooney PC

(57) ABSTRACT

A vehicle air conditioning apparatus includes: a refrigerant circuit in which a compressor, a heat source side heat exchanger, an expansion device, and a load side heat exchanger are connected by pipes; and a controller that performs switching between a heating operation in which refrigerant in the refrigerant circuit circulates and a defrosting operation of the heat source side heat exchanger in which the refrigerant in the refrigerant circuit circulates in a direction opposite to a direction in the heating operation.
(Continued)

The controller allows an airflow flowing from the load side heat exchanger into a cabin through a first air outlet in the heating operation, and an airflow flowing from the cabin into the load side heat exchanger through the first air outlet is produced in the defrosting operation of the heat source side heat exchanger.

8 Claims, 4 Drawing Sheets

(51) Int. Cl.
    *B60H 1/32*     (2006.01)
    *F24F 11/89*     (2018.01)
    *F25B 29/00*     (2006.01)

(58) Field of Classification Search
    CPC ........... F24F 11/43; B60H 2001/00235; B60H 1/00021; B60H 2001/00961; B60H 2001/3255; B60H 2001/3257; B60H 2001/3258; B60H 2001/326; B60H 2001/3261; B60H 2001/3263; B60H 1/00892; F25B 47/02; F25B 47/022; F25B 47/025; F25B 2313/021; F25B 2313/0293; F25B 2313/0294
    USPC .................................................. 62/278, 325
    See application file for complete search history.

(56) References Cited

U.S. PATENT DOCUMENTS

| | | | | | |
|---|---|---|---|---|---|
| 2,401,560 | A | * | 6/1946 | Graham | F24F 1/02 165/240 |
| 2,724,247 | A | * | 11/1955 | Kurtz | F24F 11/30 62/325 |
| 3,500,655 | A | * | 3/1970 | Lyons | F25B 49/027 165/909 |
| 4,178,767 | A | * | 12/1979 | Shaw | F25B 47/025 62/155 |
| 4,478,053 | A | * | 10/1984 | Yano | F24F 1/027 62/262 |
| 5,095,711 | A | * | 3/1992 | Marris | F25B 47/025 62/156 |
| 8,347,643 | B2 | * | 1/2013 | Taras | F24F 3/153 62/150 |
| 2008/0190131 | A1 | * | 8/2008 | Giallombardo | F24F 1/48 62/324.5 |
| 2014/0338381 | A1 | | 11/2014 | Nomoto et al. | |

FOREIGN PATENT DOCUMENTS

| | | |
|---|---|---|
| JP | 61-60045 U | 4/1986 |
| JP | 02-14914 A | 1/1990 |
| JP | 6-61524 A | 8/1994 |
| JP | 7-055296 A | 3/1995 |
| JP | H07-205646 A | 8/1995 |
| JP | 2013-139245 A | 7/2013 |
| JP | 2013-173410 A | 9/2013 |
| WO | 2013-038438 A1 | 3/2013 |

OTHER PUBLICATIONS

International Search Report (PCT/ISA/210) dated Jul. 21, 2015, by the Japanese Patent Office as the International Searching Authority for International Application No. PCT/JP2015/062001.
Written Opinion (PCT/ISA/237) dated Jul. 21, 2015, by the Japanese Patent Office as the International Searching Authority for International Application No. PCT/JP2015/062001.
Office Action dated Oct. 4, 2016, by the Japanese Patent Office for Application No. 2016-519182.
The extended European Search Report dated Aug. 28, 2017, by the European Patent Office in corresponding European Application No. 15793250.0. (8 pages).

* cited by examiner

VEHICLE AIR CONDITIONING APPARATUS, VEHICLE INCLUDING THE SAME, AND METHOD FOR CONTROLLING VEHICLE AIR CONDITIONING APPARATUS

TECHNICAL FIELD

The present invention relates to a vehicle air conditioning apparatus, a vehicle including the vehicle air conditioning apparatus, and a method for controlling a vehicle air conditioning apparatus.

BACKGROUND ART

A conventional vehicle air conditioning apparatus includes a refrigerant circuit in which a compressor, a heat source side heat exchanger, an expansion device, and a load side heat exchanger are connected by pipes, and a control unit that performs switching between a heating operation and a defrosting operation of the heat source side heat exchanger. In the defrosting operation of the heat-source side heat exchanger, the control unit circulates refrigerant in the refrigerant circuit in a direction opposite to that in the heating operation (see, for example, Patent Literature 1).

CITATION LIST

Patent Literature

Patent Literature 1: Japanese Unexamined Patent Application Publication No. 7-55296 (paragraph [0005])

SUMMARY OF INVENTION

Technical Problem

In the conventional vehicle air conditioning apparatus, in general, the control unit operates the load side air-sending device in the heating operation to produce an airflow flowing from the load side heat exchanger into a cabin and stops the load side air-sending device in the defrosting operation of the heat source side heat exchanger. In this control, a flow of air cooled by the load side heat exchanger into the cabin can be suppressed in the defrosting operation of the heat source side heat exchanger.

When refrigerant in the refrigerant circuit circulates while the load side air-sending device stops, however, the heat exchange amount (heat absorption amount) becomes insufficient in the load side heat exchanger so that a low-pressure side pressure in the refrigerant circuit decreases. Consequently, high-pressure side pressure in the refrigerant circuit decreases. Thus, the time necessary for the defrosting operation of the heat source side heat exchanger increases, and the temperature in the cabin decreases accordingly. As a result, comfort of a passenger, for example, is degraded. That is, the conventional vehicle air conditioning apparatus has a problem of a low operation efficiency in the defrosting operation of the heat source side heat exchanger.

The present invention has been made in view of the foregoing problems, and provides a vehicle air conditioning apparatus having an enhanced operation efficiency in a defrosting operation of a heat source side heat exchanger. The present invention also provides a vehicle including such a vehicle air conditioning apparatus. The present invention also provides a method for controlling a vehicle air conditioning apparatus having an enhanced operation efficiency in a defrosting operation of a heat source side heat exchanger.

Solution to Problem

A vehicle air conditioning apparatus according to an embodiment of the present invention includes; a refrigerant circuit in which a compressor, a heat source side heat exchanger, an expansion device; and a load side heat exchanger are connected by pipes; and a control unit that performs switching between a heating operation in which refrigerant in the refrigerant circuit circulates and a defrosting operation of the heat source side heat exchanger in which the refrigerant in the refrigerant circuit circulates in a direction opposite to a direction in the heating operation, wherein the control unit allows an airflow flowing from the load side heat exchanger into a cabin through a first air outlet in the heating operation, and allows an airflow flowing from the cabin into the load side heat exchanger through the first air outlet in the defrosting operation of the heat source side heat exchanger.

Advantageous Effects of Invention

In the vehicle air conditioning apparatus according to an embodiment of the present invention, the control unit produces an airflow flowing from the load side heat exchanger into the cabin through the first air outlet in the heating operation, and produces an airflow flowing from the cabin into the load side heat exchanger through the first air outlet in the defrosting operation of the heat source side heat exchanger. Thus, in the defrosting operation of the heat source side heat exchanger, air in the cabin heated by the heating operation is supplied to the load side heat exchanger so that a decrease in a low-pressure side pressure of the refrigerant circuit can be suppressed. As a result, a decrease in high-pressure side pressure of the refrigerant circuit can be suppressed so that an operation efficiency in the defrosting operation of the heat source side heat exchanger can be enhanced. In addition, since a relatively high-temperature air remaining around the first air outlet is supplied to the load side heat exchanger, the operation efficiency in the defrosting operation of the heat source side heat exchanger can be further enhanced.

DESCRIPTION OF EMBODIMENTS

Figure 1:
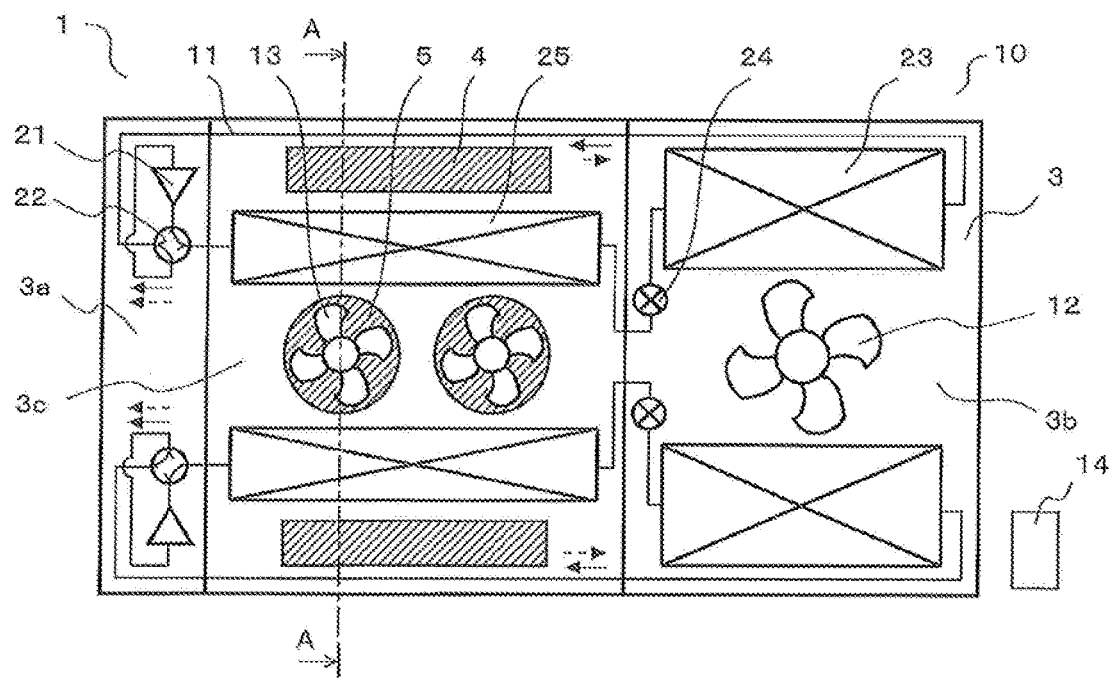
FIG. 1 is a view for illustrating a configuration and a behavior of a vehicle air conditioning apparatus according to Embodiment 1.

A vehicle air conditioning apparatus according to the present invention will be hereinafter described with reference to the drawings.

The vehicle air conditioning apparatus according to the present invention may be applied to railway vehicles, large buses, or other vehicles. The following description is directed to a case where a refrigerant circuit of the vehicle air conditioning apparatus according to the present invention, for example, is disposed above a ceiling of a cabin. The present invention, however, is not limited to such a case, and all or a part of the refrigerant circuit of the vehicle air conditioning apparatus according to the present invention may be disposed under a floor of the cabin, for example.

Configurations and behaviors, for example, described below are merely examples, and the vehicle air conditioning apparatus according to the present invention is not limited to such configurations and behaviors, for example. In the drawings, the same or like components or parts are denoted by the same reference characters, or not denoted by such reference characters. Detailed structures are simplified or omitted in the drawings as necessary. Repetitive description will be simplified or omitted as necessary.

Embodiment 1

A vehicle air conditioning apparatus according to Embodiment 1 will now be described.

<Configuration and Behavior of Vehicle Air Conditioning Apparatus>

A configuration and a behavior of the vehicle air conditioning apparatus according to Embodiment 1 will be described.

Figure 2:
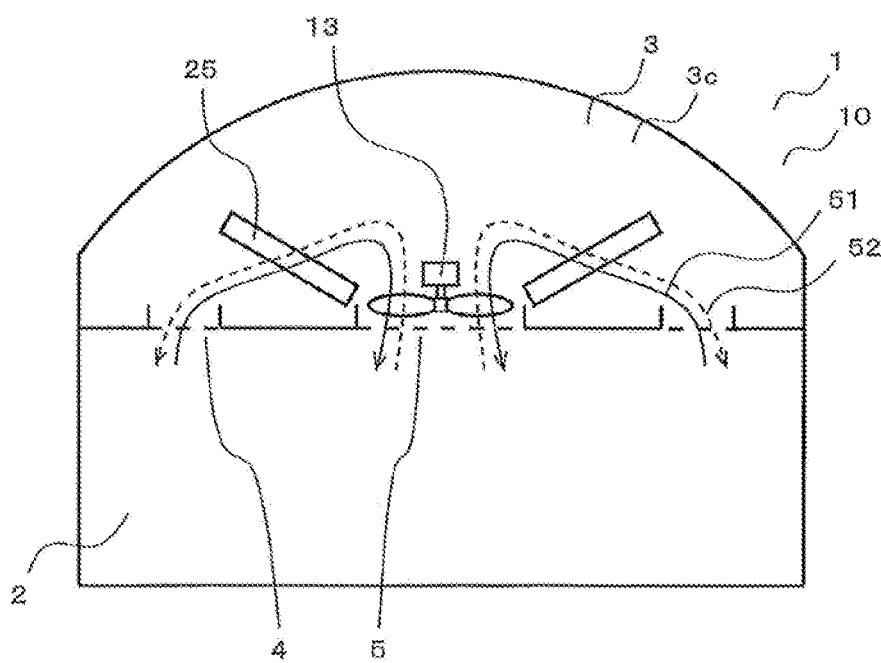
FIG. 2 is a view for illustrating the configuration and the behavior of the vehicle air conditioning apparatus according to Embodiment 1.

FIGS. 1 and 2 are views for illustrating a configuration and a behavior of the vehicle air conditioning apparatus according to Embodiment 1. FIG. 1 illustrates a vehicle air conditioning apparatus 10 when viewed from above a space above a ceiling (an above-ceiling space) 3 of a cabin 2 of a vehicle 1. FIG. 2 illustrates the vehicle air conditioning apparatus 10 when the vehicle 1 is viewed in a cross section taken along line A-A in FIG. 1. In FIG. 1, a flow of refrigerant in a heating operation is indicated by solid black arrows, a flow of refrigerant in a defrosting operation of a heat source side heat exchanger 23 is indicated by broken black arrows, and a channel of a channel switching device 22 in a heating operation is indicated by solid lines, and a channel of the channel switching device 22 in a defrosting operation of the heat source side heat exchanger 23 is indicated by broken lines.

As illustrated in FIGS. 1 and 2, the above-ceiling space 3 of the cabin 2 of the vehicle 1 includes a machine room 3a, a heat source room 3b, and a load room 3c. The vehicle air conditioning apparatus 10 includes a refrigerant circuit 11, a heat source side air-sending device 12, a load side air-sending device 13, and a control device 14. A compressor 21, a channel switching device 22, a heat source side heat exchanger 23, an expansion device 24, and a load side heat exchanger 25 are connected by pipes, thereby constituting a refrigerant circuit 11. The channel switching device 22 may be a four-way valve or another type of channel switching device.

In the machine room 3a, the compressor 21 and the channel switching device 22 are disposed. In the heat source room 3b, the heat source side heat exchanger 23, the expansion device 24, and the heat source side air-sending device 12 are disposed. In the load room 3c, the load side heat exchanger 25 and the load side air-sending device 13 are disposed. The load side air-sending device 13 is disposed in an air passage in which the load side heat exchanger 25 and a first air outlet 5 formed in, for example, the ceiling of the cabin 2 communicate with each other. A duct may be interposed in the air passage in which the load side air-sending device 13 and the first air outlet 5 communicate with each other.

The control device 14 controls the entire behavior of the vehicle air conditioning apparatus 10. The control device 14 may disposed in the above-ceiling space 3 of the vehicle 1 or in space except the above-ceiling space 3 of the vehicle 1, or may be disposed outside the vehicle 1 to control a behavior of the vehicle air conditioning apparatus 10 remotely. The control device 14 may be, for example, a microprocessor unit, or a device that can be updated, such as a firmware, or may be, for example, a program module to be executed based on an instruction from, for example, a CPU. The control device 14 corresponds to a "controller" in the present invention.

The control device 14 causes the vehicle air conditioning apparatus 10 to perform at least a heating operation. In a case where the vehicle air conditioning apparatus 10 is of a type that can switch between a heating operation and a cooling operation, the control device 14 causes the vehicle air conditioning apparatus 10 to perform at least the heating operation and the cooling operation. To remove frost attached to the heat source side heat exchanger 23 by the heating operation, the control device 14 causes the vehicle air conditioning apparatus 10 to perform a defrosting operation of the heat source side heat exchanger 23, regularly or based on an output of, for example, a sensor. In the defrosting operation of the heat source side heat exchanger 23, the following behavior in the defrosting operation of the heat source side heat exchanger 23 may be always performed, or may be selectively performed when necessary.

(Behavior in Heating Operation)

The control device 14 switches a channel of the channel switching device 22 so that a discharge side of the compressor 21 and the load side heat exchanger 25 communicate with each other. The control device 14 rotates a fan (e.g., propeller fan) of the load side air-sending device 13 in a positive direction to produce an airflow 51 flowing from the cabin 2 into the load side heat exchanger 25 through a first air inlet 4 formed in, for example, the ceiling of the cabin 2 and flowing from the load side heat exchanger 25 into the cabin 2 through the first air outlet 5 formed in, for example, the ceiling of the cabin 2.

High-temperature, high-pressure refrigerant discharged from the compressor 21 flows into the load side heat exchanger 25. The refrigerant that has flowed into the load side heat exchanger 25 exchanges heat with air passing through the load side heat exchanger 25 to be condensed, and flows into the expansion device 24. The refrigerant depressurized in expansion device 24 flows into the heat source side heat exchanger 23, exchanges heat with air passing through the heat source side heat exchanger 23 to evaporate, and is sucked into the compressor 21.

(Behavior in Defrosting Operation of Heat Source Side Heat Exchanger)

The control device 14 switches the channel of the channel switching device 22 so that the discharge side of the compressor 21 communicates with the heat source side heat exchanger 23. The control device 14 rotates the fan (e.g., propeller fan) of the load side air-sending device 13 in a negative direction to produce an airflow 52 flowing from the cabin 2 into the load side heat exchanger 25 through the first air outlet 5 formed in, for example, the ceiling of the cabin 2 and flowing from the load side heat exchanger 25 into the cabin 2 through the first air inlet 4 formed in, for example, the ceiling of the cabin 2.

High-temperature, high-pressure refrigerant discharged from the compressor 21 flows into the heat source side heat exchanger 23. The refrigerant that has flowed into the heat source side heat exchanger 23 melts frost on the heat source side heat exchanger 23 and flows into the expansion device 24. The refrigerant depressurized in the expansion device 24 flows into the load side heat exchanger 25, exchanges heat with air passing through the load side heat exchanger 25, and is sucked into the compressor 21.

<Actions of Vehicle Air Conditioning Apparatus>

Actions of the vehicle air conditioning apparatus according to Embodiment 1 will be described.

In the vehicle air conditioning apparatus 10, the control device 14 produces the airflow 51 flowing from the cabin 2 into the load side heat exchanger 25 through the first air inlet 4 and flowing from the load side heat exchanger 25 into the cabin 2 through the first air outlet 5 in the heating operation, and produces the airflow 52 flowing from the cabin 2 into the load side heat exchanger 25 through the first air outlet 5 and flowing from the load side heat exchanger 25 into the cabin 2 through the first air inlet 4 in the defrosting operation of the heat source side heat exchanger 23. Thus, in the defrosting operation of the heat source side heat exchanger 23, high-temperature air in the cabin 2 heated in the heating operation is supplied to the load side heat exchanger 25 so that a decrease in a low-pressure side pressure of the refrigerant circuit 11 is suppressed. As a result, a decrease in a high-pressure side pressure of the refrigerant circuit 11 is suppressed so that an operation efficiency in the defrosting operation of the heat source side heat exchanger 23 can be enhanced. In addition, since relatively high-temperature air remaining around the first air outlet 5 is supplied to the load side heat exchanger 25, the operation efficiency in the defrosting operation of the heat source side heat exchanger 23 can be further enhanced.

In the vehicle air conditioning apparatus 10, in the defrosting operation of the heat source side heat exchanger 23, the airflow 52 flowing from the cabin 2 into the load side heat exchanger 25 through the first air outlet 5 and flowing from the load side heat exchanger 25 into the cabin 2 through the first air inlet 4 is produced. Thus, air cooled by the load side heat exchanger 25 flows into the cabin 2 so that comfort of a passenger, for example, might not be obtained. In such a case, however, modifications such as disposing the first air inlet 4 at a location on the far side, for example, of a passenger or reducing the amount of air supply of the load side air-sending device 13 in the defrosting operation of the heat source side heat exchanger 23 may be employed.

In the vehicle air conditioning apparatus 10, in the defrosting operation of the heat source side heat exchanger 23, the control device 14 reverses the direction of rotation of the fan (e.g., propeller fan) of the load side air-sending device 13 relative to the direction in the heating operation. Alternatively, other techniques may be employed as long as the airflow 52 flowing from the cabin 2 into the load side heat exchanger 25 through the first air outlet 5 and flowing from the load side heat exchanger 25 into the cabin 2 through the first air inlet 4 is produced. For example, the control device 14 may change the air-sending direction of the load side air-sending device 13 by changing the orientation of the load side air-sending device 13 itself without changing the rotation direction of the fan (e.g., propeller fan) of the load side air-sending device 13. Another air-sending device oriented in a different direction from that of the load side air-sending device 13 may be disposed at together with the load side air-sending device 13 and operated by the control device 14 in the defrosting operation of the heat source side heat exchanger 23, As in the case of the vehicle air conditioning apparatus 10, in a case where the control device 14 reverses the rotation direction of the fan (e.g., propeller fan) of the load side air-sending device 13 relative to the direction in the heating operation in the defrosting operation of the heat source side heat exchanger 23, the configuration can be simplified, and thus, costs for parts, for example, can be reduced.

Embodiment 2

A vehicle air conditioning apparatus according to Embodiment 2 will be described.

Part of description already described for the vehicle air conditioning apparatus according to Embodiment 1 will be simplified or omitted as necessary.

<Configuration and Behavior of Vehicle Air Conditioning Apparatus>

A configuration and a behavior of the vehicle air conditioning apparatus according to Embodiment 2 will be described.

Figure 3:
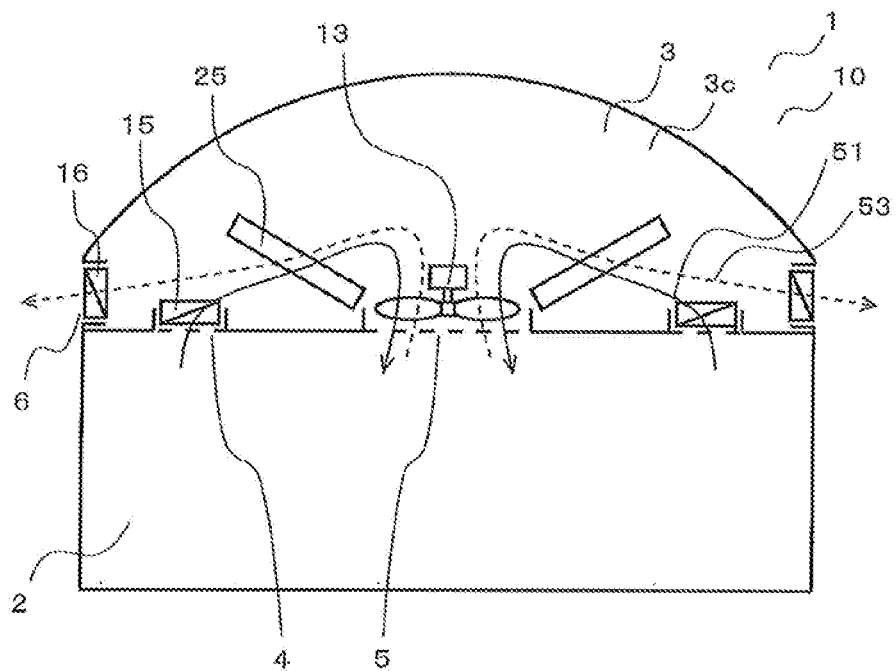
FIG. 3 is a view for illustrating a configuration and a behavior of a vehicle air conditioning apparatus according to Embodiment 2.

FIG. 3 is a view for illustrating a configuration and a behavior of the vehicle air conditioning apparatus according to Embodiment 2, FIG. 3 illustrates a vehicle air conditioning apparatus 10 when a vehicle 1 is viewed in a cross section taken along line A-A in FIG. 1.

As illustrated in FIG. 3, a load room 3c includes a second air outlet 6. A first damper 15 is disposed at a first air inlet 4, and a second damper 16 is disposed at the second air outlet 6.

(Behavior in Heating Operation)

A control device 14 opens the first damper 15 and closes the second damper 16. The control device 14 rotates a fan (e.g., propeller fan) of a load side air-sending device 13 in a positive direction to produce an airflow 51 flowing from a cabin 2 into a load side heat exchanger 25 through the first air inlet 4 formed in, for example, a ceiling of the cabin 2 and flowing from the load side heat exchanger 25 into the cabin 2 through a first air outlet 5 formed in, for example, the ceiling of the cabin 2.

(Behavior in Defrosting Operation of Heat Source Side Heat Exchanger)

The control device 14 closes the first damper 15 and opens the second damper 16. The control device 14 rotates the fan (e.g., propeller fan) of the load side air-sending device 13 in a negative direction to produce an airflow 53 flowing from the cabin 2 into the load side heat exchanger 25 through the first air outlet 5 formed in, for example, the ceiling of the cabin 2 and flowing from the load side heat exchanger 25 out of the vehicle through the second air outlet 6 formed in the load room 3c.

<Actions of Vehicle Air Conditioning Apparatus>

Actions of the vehicle air conditioning apparatus according to Embodiment 2 will be described.

In the vehicle air conditioning apparatus 10, in the defrosting operation of the heat source side heat exchanger 23, the control device 14 rotates the fan (e.g., propeller fan) of the load side air-sending device 13 in the negative direction so that the airflow 53 flowing from the cabin 2 into the load side heat exchanger 25 through the first air outlet 5 and flowing from the load side heat exchanger 25 out of the vehicle through the second air outlet 6 is produced. Thus, a flow of air cooled by the load side heat exchanger 25 into the cabin 2 can be reduced so that comfort of a passenger, for example, can be enhanced.

The vehicle air conditioning apparatus 10 includes the first damper 15 that is open in the heating operation so that the airflow 51 flowing from the cabin 2 into the load side heat exchanger 25 through the first air inlet 4 and flowing from the load side heat exchanger 25 into the cabin 2 through the first air outlet 5 passes through the first damper 15, and the control device 14 closes the first damper 15 in the defrosting operation of the heat source side heat exchanger 23. This configuration ensures reduction of a flow of air cooled by the load side heat exchanger 25 into the cabin 2 so that comfort of a passenger, for example, can be further enhanced.

The vehicle air conditioning apparatus 10 also includes the second damper 16 that is open in the defrosting operation of the heat source side heat exchanger 23 so that the airflow 53 flowing from the cabin 2 into the load side heat exchanger 25 through the first air outlet 5 and flowing from the load side heat exchanger 25 out of the vehicle through the second air outlet 6 passes through the second damper 16, and the control device 14 closes the second damper 16 in the heating operation. This configuration can achieve both enhancement of an operation efficiency while enhancing, for example, comfort of a passenger in the defrosting operation of the heat source side heat exchanger 23 and enhancement of the operation efficiency in the heating operation.

In the vehicle air conditioning apparatus 10, the control device 14 closes the first damper 15 in the defrosting operation of the heat source side heat exchanger 23 and closes the second damper 16 in the heating operation. Alternatively, the control device 14 may open the first damper 15 in the defrosting operation of the heat source side heat exchanger 23 to a degree narrower than that in the heating operation, while opening the second damper 16 in the heating operation to a degree narrower than that in the defrosting operation of the heat source side heat exchanger 23. In the case where the control device 14 closes the first damper 15 in the defrosting operation of the heat source side heat exchanger 23 and closes the second damper 16 in the heating operation, the advantages described above can be at maximum.

Embodiment 3

A vehicle air conditioning apparatus according to Embodiment 3 will be described.

Part of description already described for the vehicle air conditioning apparatuses according to Embodiments 1 and 2 will be simplified or omitted as necessary.

<Configuration and Behavior of Vehicle Air Conditioning Apparatus>

A configuration and a behavior of the vehicle air conditioning apparatus according to Embodiment 3 will be described.

Figure 4:
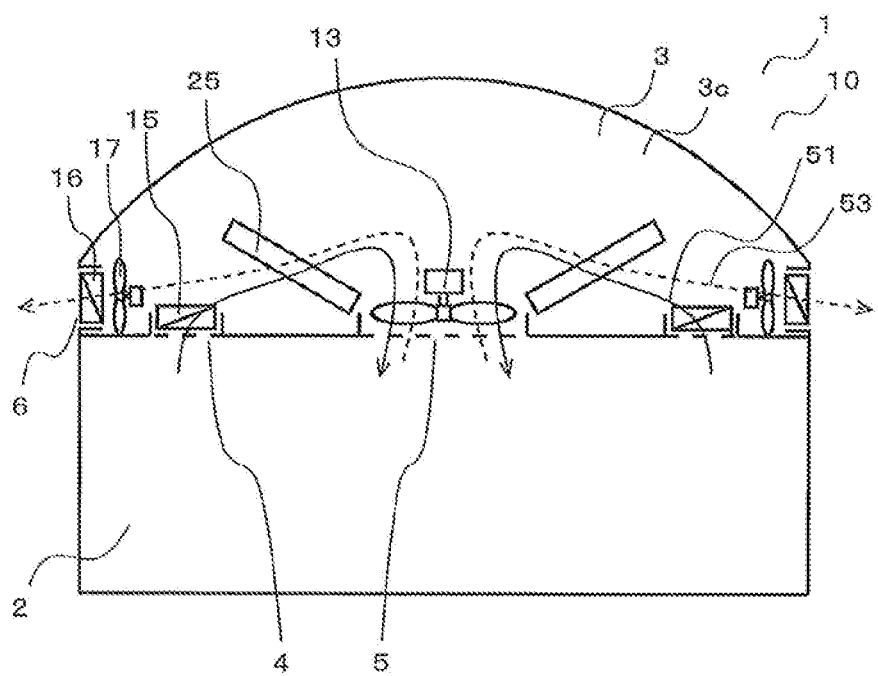
FIG. 4 is a view for illustrating a configuration and a behavior of a vehicle air conditioning apparatus according to Embodiment 3.

FIG. 4 is a view for illustrating a configuration and a behavior of the vehicle air conditioning apparatus according to Embodiment 3. FIG. 4 illustrates a vehicle air conditioning apparatus 10 when a vehicle 1 is viewed in a cross section taken along line A-A in FIG. 1.

As illustrated in FIG. 4, a load room 3c includes an auxiliary air-sending device 17. The auxiliary air-sending device 17 is disposed in an air passage in which a load side heat exchanger 25 and a second air outlet 6 formed in the load room 3c communicate with each other. A duct may be interposed in the air passage in which the auxiliary air-sending device 17 and the second air outlet 6 communicate with each other.

(Behavior in Heating Operation)

A control device 14 opens the first damper 15 and closes the second damper 16. The control device 14 rotates a fan (e.g., propeller fan) of a load side air-sending device 13 in a positive direction to produce an airflow 51 flowing from a cabin 2 into a load side heat exchanger 25 through a first air inlet 4 formed in, for example, a ceiling of the cabin 2 and flowing from the load side heat exchanger 25 into the cabin 2 through a first air outlet 5 formed in, for example, the ceiling of the cabin 2.

(Behavior in Defrosting Operation of Heat Source Side Heat Exchanger)

The control device 14 closes the first damper 15 and opens the second damper 16. The control device 14 operates the auxiliary air-sending device 17 to produce an airflow 53 flowing from the cabin 2 into the load side heat exchanger 25 through the first air outlet 5 formed in, for example, the ceiling of the cabin 2 and flowing from the load side heat exchanger 25 out of the vehicle through the second air outlet 6 formed in the load room 3c.

<Advantages of Vehicle Air Conditioning Apparatus>

Advantages of the vehicle air conditioning apparatus according to Embodiment 3 will be described.

In the vehicle air conditioning apparatus 10, in the defrosting operation of the heat source side heat exchanger 23, the control device 14 operates the auxiliary air-sending device 17 so that the airflow 53 flowing from the cabin 2 into the load side heat exchanger 25 through the first air outlet 5 and flowing from the load side heat exchanger 25 out of the vehicle through the second air outlet 6 is produced, Thus, it is possible to enhance an operation efficiency in the defrosting operation of the heat source side heat exchanger 23 without employing an air-sending device that can obtain an air-sending amount even with a rotation of the fan (e.g., propeller fan) in a negative direction working as the load side air-sending device 13. Thus, flexibility of the vehicle air conditioning apparatus 10 can be increased.

In the vehicle air conditioning apparatus 10, the control device 14 operates only the auxiliary air-sending device 17 in the defrosting operation of the heat source side heat exchanger 23. Alternatively, in operating the auxiliary air-sending device 17 by the control device 14, the fan (e.g., propeller fan) of the load side air-sending device 13 may be always rotated or may be selectively rotated when necessary in the negative direction.

Embodiment 4

A vehicle air conditioning apparatus according to Embodiment 4 will be described.

Part of description already described for the vehicle air conditioning apparatuses according to Embodiments 1 to 3 will be simplified or omitted as necessary.

<Configuration and Behavior of Vehicle Air Conditioning Apparatus>

A configuration and a behavior of the vehicle air conditioning apparatus according to Embodiment 4 will be described.

Figure 5:
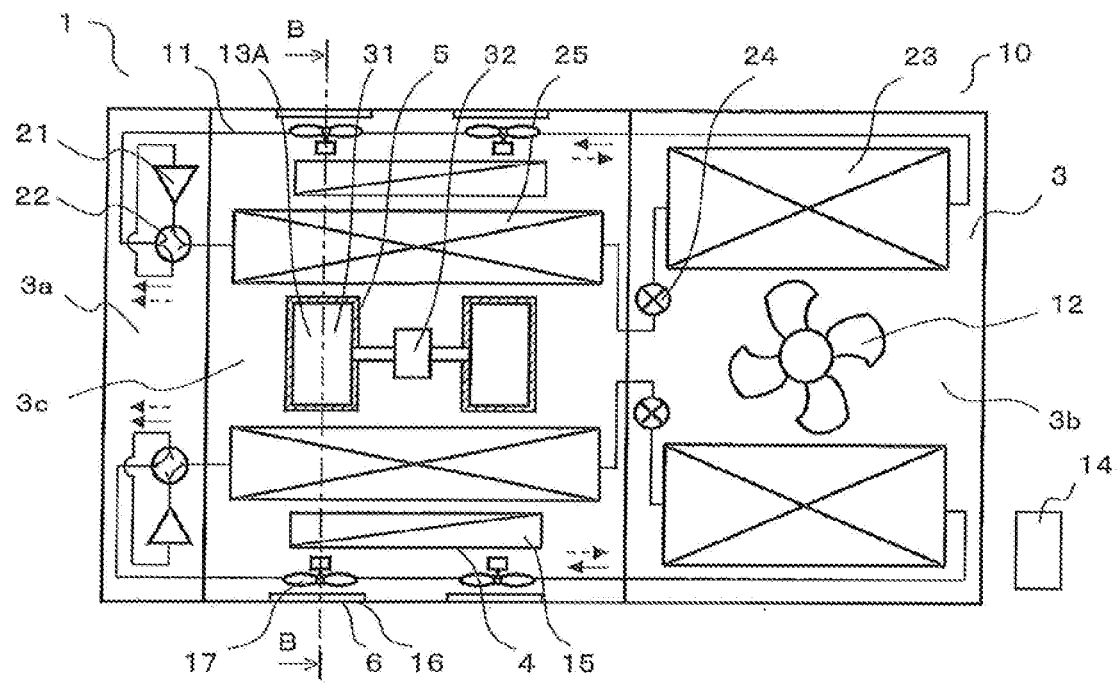
FIG. 5 is a view for illustrating a configuration and a behavior of a vehicle air conditioning apparatus according to Embodiment 4.
Figure 6:
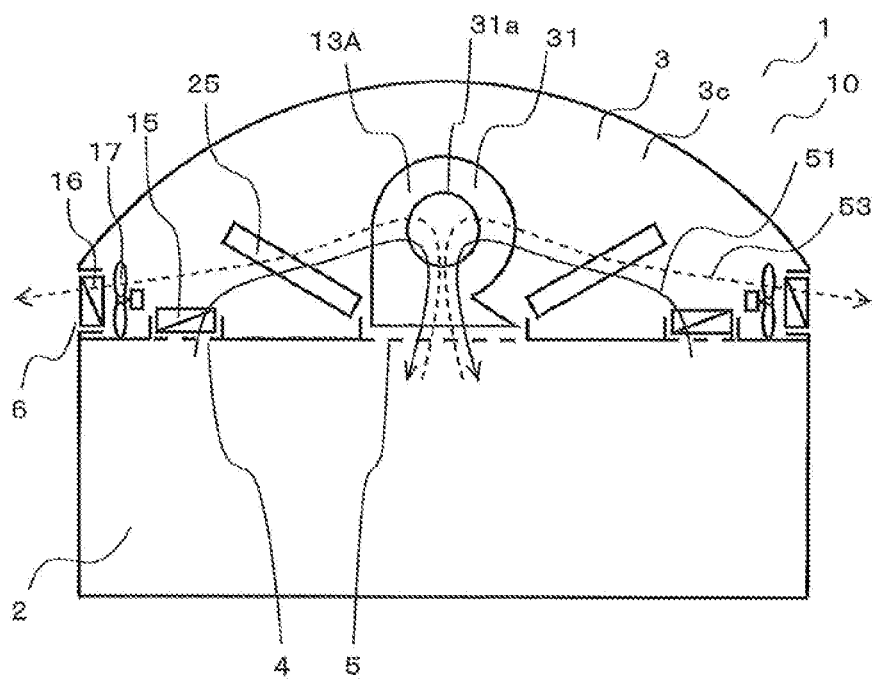
FIG. 6 is a view for illustrating the configuration and the behavior of the vehicle air conditioning apparatus according to Embodiment 4.

FIGS. 5 and 6 are views for illustrating a configuration and a behavior of the vehicle air conditioning apparatus according to Embodiment 4. FIG. 5 illustrates a vehicle air conditioning apparatus 10 when viewed from above an above-ceiling space 3 of a cabin 2 of a vehicle 1. FIG. 6 illustrates the vehicle air conditioning apparatus 10 when the vehicle 1 is viewed in a cross section taken along line B-B in FIG. 5. In FIG. 5, a flow of refrigerant in a heating operation is indicated by solid black arrows, a flow of refrigerant in a defrosting operation of a heat source side heat exchanger 23 is indicated by broken black arrows, and a channel of a channel switching device 22 in the heating operation is indicated by solid lines, and a channel of the channel switching device 22 in the defrosting operation of the heat source side heat exchanger 23 is indicated by broken lines.

As illustrated in FIGS. 5 and 6, a load side air-sending device 13A employing a sirocco fan 31 is disposed in a load room 3c. The sirocco fan 31 includes air inlets 31a at each of locations on the far side and the near side of a driving motor 32 in a rotation axis direction. The air inlet 31a may be disposed only at the location on the far side of the driving motor 32. The load side air-sending device 13A sucks air from the air inlet 31a and blows out the air into the cabin 2 through a first air outlet 5 formed in a lower portion of the load side air-sending device 13A.

(Behavior in Heating Operation)

A control device 14 opens a first damper 15 and closes a second damper 16. The control device 14 operates the load side air-sending device 13A to produce an airflow 51 flowing from the cabin 2 into a load side heat exchanger 25 through a first air inlet 4 formed in, for example, the ceiling of the cabin 2 and flowing from the load side heat exchanger 25 into the cabin 2 through the first air outlet 5 formed in, for example, the ceiling of the cabin 2.

(Behavior in Defrosting Operation of Heat Source Side Heat Exchanger)

The control device 14 closes the first damper 15 and opens the second damper 16. The control device 14 operates the auxiliary air-sending device 17 to produce an airflow 53 flowing from the cabin 2 into the load side heat exchanger 25 through the first air outlet 5 formed in, for example, the ceiling of the cabin 2 and flowing from the load side heat exchanger 25 out of the vehicle through a second air outlet 6 formed in the load room 3c.

<Actions of Vehicle Air Conditioning Apparatus>

Actions of the vehicle air conditioning apparatus according to Embodiment 4 will be described.

In the vehicle air conditioning apparatus 10, in the defrosting operation of the heat source side heat exchanger 23, the control device 14 operates the auxiliary air-sending device 17 so that an airflow 53 flowing from the cabin 2 into the load side heat exchanger 25 through the first air outlet 5 and flowing from the load side heat exchanger 25 out of the vehicle through the second air outlet 6 is produced. Thus, although an operation efficiency in the defrosting operation of the heat source side heat exchanger 23 is enhanced, the load side air-sending device 13A employing the sirocco fan 31 can be used. As a result, the operation efficiency in the heating operation can be enhanced.

Embodiment 5

A vehicle air conditioning apparatus according to Embodiment 5 will be described.

Part of description already described for the vehicle air conditioning apparatuses according to Embodiments 1 to 4 will be simplified or omitted as necessary.

<Configuration and Behavior of Vehicle Air Conditioning Apparatus>

A configuration and a behavior of the vehicle air conditioning apparatus according to Embodiment 5 will be described.

Figure 7:
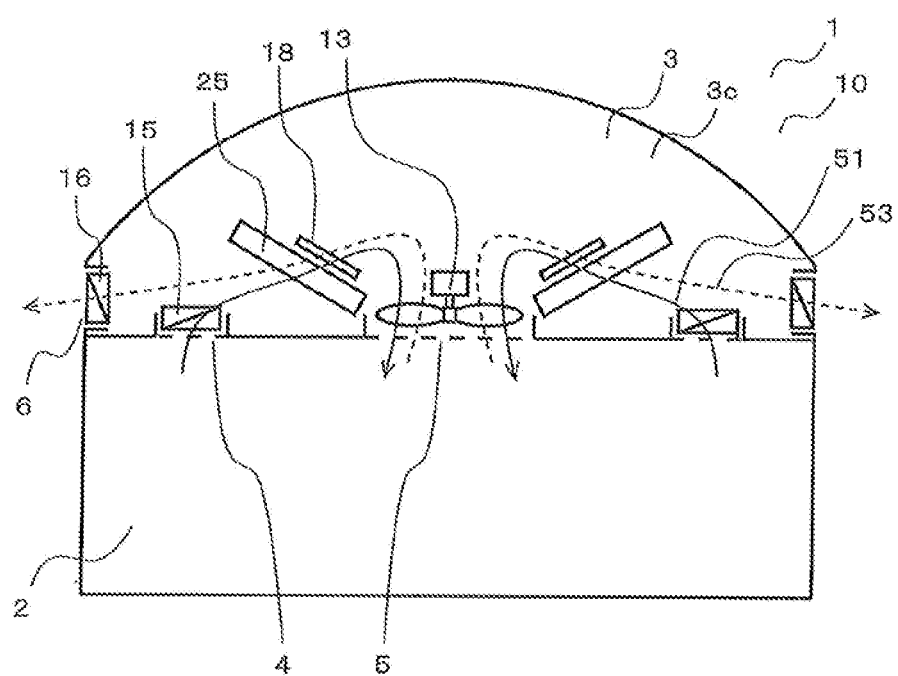
FIG. 7 is a view for illustrating a configuration and a behavior of a vehicle air conditioning apparatus according to Embodiment 5.

FIG. 7 is a view for illustrating a configuration and a behavior of the vehicle air conditioning apparatus according to Embodiment 5. FIG. 7 illustrates a vehicle air conditioning apparatus 10 when a vehicle 1 is viewed in a cross section taken along line A-A in FIG. 1.

As illustrated in FIG. 7, a heater 18 is disposed in a load room 3c. The heater 18 is disposed in an air passage in which a load side heat exchanger 25 and a first air outlet 5 communicate with each other.

The control device 14 causes the vehicle air conditioning apparatus 10 to perform at least a heating operation and a cooling operation. To remove frost attached to a load side heat exchanger 25 by the cooling operation, the control device 14 causes the vehicle air conditioning apparatus 10 to perform a defrosting operation of the load side heat exchanger 25, regularly or based on an output of, for example, a sensor. In the defrosting operation of the load side heat exchanger 25, the following behavior in the defrosting operation of the load side heat exchanger 25 may be always performed, or may be selectively performed when necessary.

(Behavior in Heating Operation)

A control device 14 opens a first damper 15 and closes a second damper 16. The control device 14 rotates a fan (e.g., propeller fan) of a load side air-sending device 13 in a positive direction to produce an airflow 51 flowing from a cabin 2 into the load side heat exchanger 25 through a first air inlet 4 formed in, for example, a ceiling of the cabin 2 and flowing from the load side heat exchanger 25 into the cabin 2 through the first air outlet 5 formed in, for example, the ceiling of the cabin 2.

(Behavior in Defrosting Operation of Heat Source Side Heat Exchanger)

The control device 14 closes the first damper 15 and opens the second damper 16. The control device 14 rotates a fan (e.g., propeller fan) of the load side air-sending device 13 in a negative direction to produce an airflow 53 flowing from the cabin 2 into the load side heat exchanger 25 through the first air outlet 5 formed in, for example, the ceiling of the cabin 2 and flowing from the load side heat exchanger 25 out of the vehicle through a second air outlet 6 formed in the load room 3c. The control device 14 operates the heater 18.

(Behavior in Cooling Operation)

The control device 14 switches a channel of a channel switching device 22 so that a discharge side of a compressor 21 communicates with a heat source side heat exchanger 23. High-temperature, high-pressure refrigerant discharged from the compressor 21 flows into the heat source side heat exchanger 23. The refrigerant that has flowed into heat source side heat exchanger 23 exchanges heat with air passing through the heat source side heat exchanger 23 to be condensed, and flows into an expansion device 24. The refrigerant depressurized in the expansion device 24 flows into the load side heat exchanger 25, exchanges heat with air passing through the load side heat exchanger 25 to evaporate, and is sucked into the compressor 21.

(Behavior in Defrosting Operation of Load Side Heat Exchanger)

The control device 14 operates the heater 18 and melts frost on the load side heat exchanger 25. The control device 14 does not need to circulate refrigerant in a refrigerant circuit 11, and may switch the channel of the channel switching device 22 so that the discharge side of the compressor 21 and the load side heat exchanger 25 communicate with each other to circulate the refrigerant in the refrigerant circuit 11.

<Actions of Vehicle Air Conditioning Apparatus>

Actions of the vehicle air conditioning apparatus according to Embodiment 5 will be described.

In the vehicle air conditioning apparatus 10, the control device 14 causes the airflow 53 flowing from the cabin 2 into the load side heat exchanger 25 through the first air outlet 5 and flowing from the load side heat exchanger 25 out of the vehicle through the second air outlet 6 to be produced in the defrosting operation of the heat source side heat exchanger 23, and operates the heater 18 disposed in an air passage in which the load side heat exchanger 25 and the first air outlet 5 communicate with each other. This configuration can further enhance an operation efficiency in the defrosting operation of the heat source side heat exchanger 23.

In the vehicle air conditioning apparatus 10, the control device 14 operates the heater 18 disposed near the air passage in which the load side heat exchanger 25 and the first air outlet 5 communicate with each other, that is, near the load side heat exchanger 25, in the defrosting operation of the load side heat exchanger 25 so that frost on the load side heat exchanger 25 can melt. Accordingly, the defrosting operation of the load side heat exchanger 25 can be performed without adding other parts so that costs for, for example, parts of the vehicle air conditioning apparatus 10 can be reduced.

The foregoing description is directed to Embodiments 1 through 5. The present invention, however, is not limited to the description of the Embodiments. For example, in Embodiments 1 through 5, all or a part of an embodiment may be added to another, or all or a part of an embodiment may be replaced with all or a part of another embodiment.

REFERENCE SIGNS LIST 1 vehicle, 2 cabin, 3 above-ceiling space, 3a machine room, 3b heat source room, 3c load room, 4 first air inlet, 5 first air outlet, 6 second air outlet, 10 vehicle air conditioning apparatus, 11 refrigerant circuit, 12 heat source side air-sending device, 13, 13A load side air-sending device, 14 control device, 15 first damper, 16 second damper, 17 auxiliary air-sending device, 18 heater, 21 compressor, 22 channel switching device, 23 heat source side heat exchanger, 24 expansion device, 25 load side heat exchanger, 31 sirocco fan, 31a air inlet, 32 driving motor, 51 to 53 airflow.

The invention claimed is:

1. A vehicle air conditioning apparatus comprising:
a refrigerant circuit in which a compressor, a heat source side heat exchanger, an expansion device, and a load side heat exchanger are connected by pipes;
a controller configured to perform switching between a heating operation in which refrigerant in the refrigerant circuit circulates and a defrosting operation of the heat source side heat exchanger in which the refrigerant in the refrigerant circuit circulates in a direction opposite to a direction in the heating operation, wherein
the controller allows an airflow flowing from the load side heat exchanger into a cabin through a first air outlet in the heating operation, and allows an airflow flowing from the cabin into the load side heat exchanger through the first air outlet in the defrosting operation of the heat source side heat exchanger;
at least a pair of auxiliary air-sending devices provided at both sides of the vehicle and each configured to produce an airflow flowing from the load side heat exchanger to outside a vehicle through each of second air outlets that are provided at the both sides of the vehicle, wherein the controller operates the at least a pair of auxiliary air-sending devices in the defrosting operation of the heat source side heat exchanger; and
a first damper that is open in the heating operation so that an airflow flowing from the cabin into the load side heat exchanger through a first air inlet passes through the first damper, wherein
in the defrosting operation of the heat source side heat exchanger, the controller closes the first damper or opens the first damper to a degree narrower than a degree in the heating operation.

2. The vehicle air conditioning apparatus of claim 1, further comprising
a load side air-sending device configured to produce an airflow flowing from the load side heat exchanger into the cabin through the first air outlet in the heating operation, wherein
in the defrosting operation of the heat source side heat exchanger, the controller reverses an air-sending direction of the load side air-sending device relative to an air-sending direction in the heating operation.

3. The vehicle air conditioning apparatus of claim 2, wherein in the defrosting operation of the heat source side heat exchanger, the controller reverses a rotation direction of the load side air-sending device relative to a rotation direction in the heating operation.

4. The vehicle air conditioning apparatus of claim 1, further comprising:
a load side air-sending device configured to produce an airflow flowing from the load side heat exchanger into the cabin through the first air outlet; and
wherein
the load side air-sending device is a sirocco fan.

5. The vehicle air conditioning apparatus of claim 1, further comprising
a second damper that is open in the defrosting operation of the heat source side heat exchanger so that an airflow flowing from the load side heat exchanger to outside a vehicle through the second air outlet passes through the second damper, wherein
in the heating operation, the controller closes the second damper or opens the second damper to a degree narrower than a degree in the defrosting operation of the heat source side heat exchanger.

6. The vehicle air conditioning apparatus of claim 1, wherein
a heater is disposed in an air passage in which the load side heat exchanger and the first air outlet communicate with each other, and
the controller operates the heater in the defrosting operation of the heat source side heat exchanger.

7. The vehicle air conditioning apparatus of claim 6, wherein
the controller operates the heater in the defrosting operation of the load side heat exchanger.

8. A vehicle comprising the vehicle air conditioning apparatus of claim 1.

* * * * *